United States Patent
Muramoto et al.

(10) Patent No.: US 6,436,859 B1
(45) Date of Patent: Aug. 20, 2002

(54) GLASS COMPOSITION AND ION EXCHANGE STRENGTHENED GLASS ARTICLE PRODUCED FROM SAME

(75) Inventors: Tadashi Muramoto; Shinichi Aratani, both of Mie (JP)

(73) Assignee: Central Glass Company, Limited, Ube (JP)

(*) Notice: Subject to any disclaimer, the term of this patent is extended or adjusted under 35 U.S.C. 154(b) by 0 days.

(21) Appl. No.: 09/533,818

(22) Filed: Mar. 24, 2000

(30) Foreign Application Priority Data

Mar. 25, 1999 (JP) .......................... 11-080809
Jan. 31, 2000 (JP) ....................... 2000-022314

(51) Int. Cl.$^7$ .......................... C03C 3/085; C03C 3/087
(52) U.S. Cl. .......................... 501/69; 501/70; 65/30.13; 65/30.14
(58) Field of Search ................ 501/68, 69, 70; 428/694 ST, 694 SG; 65/30.13, 30.14

(56) References Cited

U.S. PATENT DOCUMENTS

| | | | |
|---|---|---|---|
| 4,038,090 A | | 7/1977 | Gliemeroth .................. 106/53 |
| 4,156,755 A | | 5/1979 | Rinehart ..................... 428/410 |
| 5,858,897 A | * | 1/1999 | Maeda et al. ................. 501/70 |
| 5,900,296 A | * | 5/1999 | Hayashi et al. ............... 501/55 |
| 5,972,460 A | * | 10/1999 | Tachiwana .................. 428/64.2 |
| 6,162,750 A | * | 12/2000 | Miwa et al. .................. 501/69 |
| 6,187,441 B1 | * | 2/2001 | Takeuchi et al. ............ 428/410 |

FOREIGN PATENT DOCUMENTS

| | | | |
|---|---|---|---|
| DE | 42 06 268 | | 11/1992 |
| JP | 1969-0054102 | * | 7/1969 |
| JP | 5-32431 | | 2/1993 |
| JP | 10-1329 | | 1/1998 |
| JP | 10-158028 | | 6/1998 |
| JP | 11-199267 | | 7/1999 |
| JP | 2001-139342 | * | 5/2001 |

* cited by examiner

*Primary Examiner*—Karl Group
(74) *Attorney, Agent, or Firm*—Crowell & Moring LLP

(57) ABSTRACT

The invention relates to a lithium-sodium-aluminosilicate glass composition. This glass composition has a softening point of 700° C. or lower; a first temperature (1450° C. or lower) at which the glass composition exhibits a viscosity of $10^2$ poises; a second temperature (1000° C. or lower) at which the glass exhibits a viscosity of $10^4$ poises; and a mean thermal expansion coefficient between 30° C. and a glass transition temperature of the glass composition. This coefficient is within a range of from $90\times10^{-7}$/° C. to $130\times10^{-7}$/° C. The glass composition can be easily formed into a precursor of a glass article by pressing. It is possible to obtain a glass article that is chemically strengthened from the precursor by conducing alkali ion exchange.

10 Claims, No Drawings

GLASS COMPOSITION AND ION EXCHANGE STRENGTHENED GLASS ARTICLE PRODUCED FROM SAME

BACKGROUND OF THE INVENTION

The present invention relates to a glass composition which is capable of being pressed under a softened condition by heating and being chemically strengthened by alkali ion exchange. Such glass composition is suitable for obtaining glass articles such as optical glass of lenses and compact substrate glass. The present invention is more particularly relates to a substrate glass for information recording media that can be suitably used as a magnetic recording medium and so forth. In fact, this substrate glass is prepared by pressing and then chemical strengthening.

Substrate glass for information recording media, for example, is required to be able to be easily melted at a temperature comparable or lower than soda lime silica glass, have a softening temperature lower than soda lime silica glass, be able to be pressed easily and allow the formation of subtle surfaces that follow the press mold, be resistant to breakage as a result of having a thermal expansion coefficient similar to the press die, and have a high degree of so-called chemical strengthening by alkali ion exchange.

Furthermore, although it was common in the past to search for a method for grinding press formed glass to obtain surface smoothness, grinding is not preferable since it requires considerable time and trouble and has high costs. Although there have also been examples advocating the formation of a smooth surface by float process, although the float process is suitable for large-volume production of relatively large size glass such as window glass, it is not suited to manufacturing small, precise substrates such as substrates for information recording media.

Although the specification of U.S. Pat. No. 4,156,755 discloses a $SiO_2$—$Al_2O_3$—$Li_2O$—$Na_2O$ glass additionally containing $ZrO_2$ that is strengthened by ion exchange, this glass has an extremely high content of $Al_2O_3$ and $ZrO_2$, has high melting and forming temperatures and has problems with melting ease and formability (particularly with respect to press forming).

Japanese Patent Laid-Open Publication No. 10-1329 discloses a glass composition for chemical strengthening and chemically strengthened glass article comprising $SiO_2$—$Al_2O_3$—$Li_2O$—$Na_2O$—$CaO$, does not contain $ZrO_2$ and is suitable for float process. In this publication, there is no mention of press forming, and both the temperature at which the glass exhibits a viscosity of $10^2$ poises and the temperature at which the glass exhibits a viscosity of $10^4$ poises are high. In addition, due to the absence of $ZrO_2$, which is known to be a component for providing a glass with excellent water resistance and weather resistance, this glass is believed to be difficult to satisfy water resistance and weather resistance.

Japanese Patent Laid-Open Publication No. 5-32431 discloses a glass, which is to be subjected to chemical strengthening, comprising $SiO_2$, $Al_2O_3$, $Li_2O$, $Na_2O$ and $ZrO_2$, and a chemically strengthened glass produced thereby. In this publication, there is no descriptions of the temperature at which the glass exhibits a viscosity of $10^2$ poises, the temperature at which the glass exhibits a viscosity of $10^4$ poises, the softening point and the like of this glass which is to be subjected to chemical strengthening. In addition, although the $ZrO_2$ component is contained at a relatively high range, this tends to make the glass melting temperature higher and forming, and particularly press forming, difficult.

Japanese Patent Laid-Open Publication No. 10-158028 discloses a glass substrate for magnetic discs, comprising $SiO_2$, $Al_2O_3$, $Na_2O$, $K_2O$, RO and $ZrO_2$, where RO is MgO, CaO, SrO or BaO, that is resistant to scratching and suitable for float process. Press forming of this glass is not mentioned in this publication, and the temperature at which the glass exhibits a viscosity of $10^2$ poises and the temperature at which the glass exhibits a viscosity of $10^4$ poises are both high. In addition, although the $K_2O$ content is relatively high in comparison with the $Na_2O$ content, in consideration of the fact that the sodium component in the glass is ion-exchanged by molten potassium salt, efficient ion exchange is thought to be difficult.

Japanese Patent Laid-Open Publication No. 11-199267 discloses a glass substrate for magnetic discs, consisting essentially of $SiO_2$, $Al_2O_3$, $Li_2O$, $Na_2O$, $K_2O$, MgO, CaO, $ZrO_2$ and $TiO_2$.

Namely, there have been cases in the prior art having problems with formability including melting ease and press forming, inadequate weather resistance, moisture resistance and water resistance, or being unable to be chemically strengthened by ion exchange.

SUMMARY OF THE INVENTION

It is therefore an object of the present invention to provide a lithium-sodium-aluminosilicate glass composition that is capable of providing an ion exchange strengthened glass article through it pressing and then alkali ion exchange.

It is another object of the present invention to provide such ion exchange strengthened glass article.

It is a further object of the present invention to provide a process for producing such ion exchange strengthened glass article.

According to the present invention, there is provided a lithium-sodium-aluminosilicate glass composition comprising a softening point of 700° C. or lower; a first temperature at which the glass composition exhibits a viscosity of $10^2$ poises, the first temperature being 1450° C. or lower; a second temperature at which the glass exhibits a viscosity of $10^4$ poises, the second temperature being 1000° C. or lower; and a mean thermal expansion coefficient between 30° C. and a glass transition temperature of the glass composition, the coefficient being within a range of from $90 \times 10^{-7}$/° C. to $130 \times 10^{-7}$/° C.

According to the present invention, there is provided an ion exchange strengthened glass article prepared from the glass composition by a process. This process includes (a) providing the glass composition; (b) pressing the glass composition at the softening point, thereby to obtain a precursor of the glass article; and (c) bringing the precursor into contact with a molten salt comprising a potassium salt, thereby conducting an alkali ion exchange strengthening.

DESCRIPTION OF THE PREFERRED EMBODIMENTS

The glass composition of the invention can be melted easily, can be easily formed by pressing, allows the formation of subtle surfaces that closely follow the press mold, is resistant to breakage by closely approximating the thermal expansion coefficient of the press mold, and can be chemically strengthened at high degree by alkali ion exchange, and more particularly, provides a substrate glass for information recording media that can be preferably used as a magnetic recording medium and so forth.

A pressed glass composition (i.e., a precursor of an ion exchange strengthened glass article) of the present invention is produced in two stages by first melting, clarifying and homogenizing the glass raw materials, producing a preliminary formed glass having a shape that approximates the target shape by, for example, casting the resulting molten glass, and then re-heating this preliminary formed glass and supplying this to press forming. Alternatively, the pressed glass composition of the present invention can be produced in a continuous operation by first producing the above-mentioned preliminary formed glass and while still heated, supplying it to press forming after slightly adjusting the temperature.

When glass exhibits a viscosity of $10^2$ poises during its melting, the glass becomes extremely rich in fluidity This is advantageous for melting and homogenizing of the glass. Thus, the temperature at which glass exhibits a viscosity of $10^2$ poises is also referred to as the melting temperature. Common soda lime silica glasses are considered to melt easily, and the temperature at which these glasses exhibit a viscosity of $10^2$ poises is within the range of 1400–1450° C. Similarly, the temperature at which the glass composition according to the present invention exhibits a viscosity Of $10^2$ poises is 1450° C. or lower.

With respect to the temperature for the above-mentioned preliminary forming, namely the working temperature, a glass viscosity of $10^4$ poises is the viscosity that serves as an index in terms of heat forming the glass composition into the shape of a plate or container and so forth, and this also applies to the preliminary forming in the present invention. The above-mentioned temperature at which common soda lime silica glasses exhibit a viscosity of $10^4$ poises is roughly 1000° C. Similarly, the temperature at which the glass composition according to the present invention exhibits a viscosity of $10^4$ poises is 1000° or lower.

In the invention, the base material of a press die for the press forming is preferably a material having excellent heat resistance and abrasion resistance, Examples of such material include alloy steel (e.g., austenite steel), cermet (e.g., TiC—Mo—Ni-based cermet), ceramics (e.g., alumina and zirconia) and heat-resistant glass (e.g., aluminosilicate glass such as calcium-aluminosilicate glass). The base material of a press die is formed to the desired shape and optical surface and polished. Then, the surface of the press die can be covered with a thermally and chemically stable thin film which allows the heat-softened glass composition to adhere to the film. The thin film is preferably resistant to corrosion caused by the heat-softened glass composition. The film may be a precious metal film, a tungsten film, a tantalum film or an alloy film of these metals and can be formed by, for example, sputtering.

Conventionally, the surface of the pressed glass is polished after obtaining its optical surface. In contrast, the desired optical surface can be obtained by performing the above-mentioned procedure, without a polishing step.

Naturally, it is preferable that the glass composition has thermal properties and other characteristics suitable for press forming for obtaining the above-mentioned optical surface, and moreover, it is also preferable to have characteristics suitable for performing ion exchange chemical strengthening.

The viscosity of the glass composition in press forming is preferably adjusted to falling within a range of $10^{7.6}$–$10^{12}$ poises, and more preferably in the vicinity of $10^{10}$ poises. In fact, $10^{7.6}$ poises corresponds to softening point of the glass composition. In other words, the glass composition exhibits a viscosity of $10^{7.6}$ poises at its softening point. In the case of viscosity lower than $10^{7.6}$ poises, the glass may easily adhere to the surface of the press die and may not be easily separated. This may result in greater susceptibility to breakage of the glass during its separation from the press die. In addition, the press may wear rapidly. At a viscosity higher than $10^{12}$ poises, it may become difficult for the glass composition to adhere to the surface of the press die. With this, it may become difficult to obtain an optical surface that precisely follows the surface of the press die.

With respect to the temperature during the above-mentioned press forming, although the above-mentioned press base material and thin film may have excellent heat resistance, abrasion resistance and corrosion resistance, when pressing is performed repeatedly at high temperatures, the optical surface may be susceptible to damage by abrasion. The temperature, at which a common soda lime silica glass exhibits a viscosity of $10^{7.6}$ poises (softening point), is on the order of 720–740° C. In contrast, it is preferably 700° C. or lower for the glass composition of the present invention. Furthermore, it is preferably 600° C. or lower in the invention at a more preferable viscosity, namely $10^{10}$ poises.

The pressing pressure is preferably within the range of 10 Kgf/cm$^2$ to 50 Kgf/cm$^2$ (approximately 1–5 MPa). If the pressing pressure is increased to a high pressure in excess of 50 Kgf/cm$^2$, the glass composition may become susceptible to cracking and breakage, or the press itself may break. If the pressing pressure is decreased to a low pressure less than 10 Kgf/cm$^2$, it may become difficult to obtain an optical surface that matches the surface of the press die.

Within the above-mentioned ranges of glass viscosity (temperature) and pressing pressure, the formed glass adheres well to the press die (thin film). Thus, an optical surface can be obtained that precisely matches the optical surface of the above-mentioned base material of the press die.

It is preferable that the thermal expansion coefficient of the glass composition approximates that of the press die. Thus, the thermal expansion coefficient of the former is suitably set between 90×10$^{-7}$/° C. and 120×10$^{-7}$/° C. as the mean value between room temperature and the glass transition temperature. For example, in the case that the press die is made of a material selected from heat-resistant steel and a majority of heat-resistant ceramics, the thermal expansion coefficient can be roughly from 100×10$^{-7}$/° C. to 120×10$^{-7}$/° C., and in the case of calcium-aluminosilicate glass, roughly from 90×10$^{-7}$/° C. to 100×10$^{-7}$/° C.

Chemical strengthening by alkali ion exchange for the pressed glass composition can be performed by immersing the glass in a molten salt containing a potassium salt at a temperature that is equal to or lower than the glass transition temperature, at which thermal deformation of the glass is difficult, and equal to or higher than the melting point of sodium nitrate and/or potassium nitrate, and performing ion exchange for several hours. A substrate glass for information recording media is generally required to have a three-point bending strength following chemical strengthening of 1500 Kgf/cm$^2$ or more (approximately 147 MPa or more). In contrast, in the present invention, a value of 2000 Kgf/cm$^2$ or more (approximately 196 MPa or more) is preferable in consideration of further improving strength and ease of handling of the substrate glass.

As stated above, the glass composition according to the present invention is a lithium-sodium-aluminosilicate glass, and the silica component is essential for forming glass. Although the alumina component is also for forming the glass together with the silica component, it is necessary for increasing the ion exchange rate during chemical strengthening and for improving water resistance of the glass following chemical strengthening. The lithium and sodium components are necessary for facilitating melting of the glass raw materials and are effective in lowering the viscosity, softening point and glass transition temperature of the glass composition at high temperatures. The lithium component (lithium ions) in particular is essential for forming a surface compressed layer in the glass article by ion exchange with larger ion diameter sodium and potassium ions, while the sodium component (sodium ions) is essential for strengthening by similarly forming a surface compressed layer in the glass article by ion exchange with larger ion diameter potassium ions.

The glass composition preferably contains BaO and $ZrO_2$. BaO facilitates melting of the glass while also lowering the viscosity, softening point and glass transition temperature of the glass at high temperatures. The glass thermal expansion coefficient may increase resulting in poor water resistance and weather resistance when the above-mentioned lithium, sodium and other alkaline components are present in the less in larger amounts than what is necessary. In contrast, the thermal expansion coefficient can be properly adjusted by decreasing the amount of alkaline components and by introduction of BaO instead, thereby improving water resistance and weather resistance. In addition, $ZrO_2$ is effective in increasing the ion exchange rate during chemical strengthening, and significantly improves water resistance and weather resistance of the glass following chemical strengthening.

The following components can be contained in the glass composition according to the invention. $SiO_2$ is the main component that forms the glass, and in terms of percent by weight, may be contained within the range of 58–66% in the glass. If the content of $SiO_2$ is less than 58%, glass forming may be no longer easy, devitrification may occur easily and the water resistance of the glass following ion exchange chemical strengthening may be inferior. If the $SiO_2$ content exceeds 66%, the glass melting temperature increases, and the forming temperature increases for forming the glass into a shape, including preliminary forming, and particularly for press forming. Although $Al_2O_3$ is a component that forms the glass together with $SiO_2$, it is essential for increasing the ion exchange rate during chemical strengthening and for improving the water resistance of the glass following chemical strengthening. $Al_2O_3$ may be contained in the glass composition within the range of 7–15%. If the content of $Al_2O_3$ is less than 7%, the above-mentioned advantageous effects may become insufficient. If the content of $Al_2O_3$ exceeds 15%, the glass viscosity increases and thereby the temperatures of preliminary forming and press forming must be increased. In addition to $LiO_2$ being essential for performing chemical strengthening by ion exchange, it is essential for facilitating glass melting and forming at relatively low temperatures, and can be contained in the glass within the range of 4.7%. If the content of $LiO_2$ is less than 4%, the above-mentioned melting and forming temperatures rise. If the content of $LiO_2$ exceeds 7%, the glass viscosity is lowered more than what is required, and the water resistance of the glass after chemical strengthening by ion exchange may become poor. Similar to $LiO_2$, $Na_2O$ is essential for performing chemical strengthening by ion exchange, and facilitates glass melting and forming. In addition, it can be obtained at a lower cost than other alkali metal component raw materials. $Na_2O$ may be contained in the glass within the range of 10–15%. If the content of $Na_2O$ is less than 10%, glass viscosity increases and thereby the above-mentioned melting and forming temperatures must be increased. If the content of $Na_2O$ exceeds 15%, glass viscosity lowers beyond that what is necessary and the water resistance of the glass after chemical strengthening by ion exchange may become poor. $K_2O$ is suitably introduced as necessary for increasing glass meltability and for adjusting the glass viscosity and thermal expansion coefficient. Furthermore, if the content of $K_2O$ in the glass exceeds 3%, the thermal expansion coefficient may become excessively large which causes the glass viscosity to be lowered beyond that which is necessary. Consequently, the content of $K_2O$ in the glass is preferably 3% or less. MgO is suitably introduced as necessary for enhancing glass meltability and adjusting the viscosity and thermal expansion coefficient of the glass. Similar to CaO, MgO offers the advantage of being able to be obtained at a lower cost than alkali metal component raw materials. However, since the ion exchange rate is lowered if MgO is contained in excess of 4% in the glass, the content of MgO is preferably 4% or less. CaO is also a component that is suitably introduced as necessary for enhancing glass meltability and adjusting the viscosity and thermal expansion coefficient of the glass. Furthermore, since the ion exchange rate is lowered if CaO is contained in excess of 4% in the glass, the content of CaO is preferably 4% or less. BaO is a component that is effective for enhancing glass meltability and lowering the liquid phase temperature of the glass. In addition, BaO lowers the forming temperature and facilitates forming, without making the thermal expansion coefficient of the glass excessively high, as compared with alkali metal components such as $Na_2O$ and $K_2O$. Furthermore, BaO does not worsen water resistance of the glass, as compared with the above-mentioned alkali metal components. BaO may be contained in the glass within the range of 1–10%. If the content of BaO is less than 1%, the above-mentioned actions and advantageous effects may become insufficient, There is no need to contain BaO in excess of 10%, and on the contrary, this content of BaO tends to increase the thermal expansion coefficient of the glass. $TiO_2$ is a component that is suitably contained for adjusting the viscosity and thermal expansion coefficient of the glass, or improving the chemical durability of the glass following chemical strengthening by ion exchange. However, glass viscosity may increase too much resulting in poor glass melting and formability if the content of $TiO_2$ in the glass exceeds 5%. Therefore, the content of $TiO_2$ is preferably 5% or less. $ZrO_2$ serves for increasing the ion exchange rate and improving water resistance after ion exchange, and is preferably contained in the glass within the range of 1–6%. If the content of $ZrO_2$ is less than 1%, its actions and advantageous effects may become insufficient. The content of $ZrO_2$ exceeding 6% is not preferable, since glass viscosity increases and melting and forming temperature rises.

A first glass composition according to a first preferred embodiment of the present invention contains 58–65% $SiO_2$, 10–15% $Al_2O_3$, 4–6% $Li_2O$, 10–13% $Na_2O$, 0–3% $K_2O$, 0–4% Mg,O, 0–4% CaO, 0–2% SrO, 1–10% BaO, 0–5% $TiO_2$ and 1–5% $ZrO_2$. Furthermore, the first glass composition has a mean thermal expansion coefficient between 30° C. and the glass transition temperature of from $90 \times 10^{-7}/°$ C. to $120 \times 10^{-7}/°$ C. A second glass composition according to a second preferred embodiment of the present invention contains 59–66% $SiO_2$, 7–12% $Al_2O_3$, 4–7% $Li_2O$, 12–15% $Na_2O$, 0–3% $K_2O$, 0–4% MgO, 0–4% CaO, 0–2% SrO, 1–10% BaO, 0–5%/ $TiO_2$ and 3–6% $ZrO_2$. Furthermore, according to the second glass composition, the mean thermal expansion coefficient between 30° C. and the glass transition temperature is from $100 \times 10^{-7}/°$ C. to $130 \times 10^{-7}/°$ C., and the glass transition temperature is 481° C. or lower.

The following nonlimitative examples are illustrative of the present invention. In fact, Examples A-1 to A-13 are illustrative of the above-mentioned first glass composition, and Examples B-1 to B-6 are illustrative of the above-mentioned second glass composition.

EXAMPLES A-1 to A-13 & COMPARATIVE EXAMPLES A-1 to A-5

Each of these examples and comparative examples was conducted by the following procedures.

Glass Melting

Various raw materials were weighed and mixed according to the glass compositions of Table 1 using optical silica sand as the silica source, aluminum oxide as the alumina source, lithium carbonate as the lithium oxide source, sodium carbonate as the sodium oxide source, potassium carbonate as the potassium oxide source, magnesium oxide as the magnesia source, calcium carbonate as the calcia source, barium carbonate as the barium oxide source, titanium dioxide as the titania source and zircon sand as the zirconia source.

The mixed batch equivalent to 3 kg as the weight of the glass composition was filled into a 2 liter platinum crucible. After preliminarily melting for 5 hours at 1300° C. in an electric furnace, it was melted for 5 hours at 1450–1480° C. while stirring with a stirrer after which the temperature was lowered followed by clarification for 2 hours at 1300° C. The crucible was then removed from the electric furnace, and the melt was poured into a carbon mold to obtain a glass block. The glass block was then placed in an electric furnace preheated to 500–600° C. and after sufficiently maintaining heating so that the glass block reached the temperature of the electric furnace, it was annealed.

Measurement of Glass Viscosity

A piece of the resulting glass was cut off and reheated and melted in a platinum crucible followed by measurement of the temperature at which the glass exhibits a viscosity of $10^2$ poises (melting temperature) and the temperature at which the glass exhibits a viscosity of $10^4$ poises (working temperature) in accordance with a known ball updraw method. In addition, a piece of the glass was also cut off and heated and formed into a predetermined fiber shape followed by measurement of softening point (i.e., temperature at which the glass exhibits a viscosity of $10^{7.6}$ poises) and strain point (i.e., temperature at which the glass exhibits a viscosity of $10^{14.5}$ poises). A melting temperature of 1450° C. or lower, a working temperature of 1000° C. or lower, and a softening point of 700° C. or lower have been judged to be satisfactory in the invention.

Furthermore, the temperature at which the glass exhibits a viscosity of $10^{10}$ poises (preferable pressing temperature) was determined using a known viscosity-temperature relational expression according to Fulcher, $\log\eta = -A + B/(T-T_0)$ (wherein, A, B and $T_0$ are constants, $\eta$ is viscosity, and T is absolute temperature) from each of the above-mentioned viscosity and temperature properties. The above-mentioned pressing temperature is preferably 600° C. or lower. Although strain point is not specified, pressing becomes impossible at temperatures below this.

Measurement of Mean Thermal Expansion Coefficient & Glass transition temperature A piece of the glass block was further cut off and formed into a predetermined rod shape followed by determination of glass transition temperature and the mean thermal expansion coefficient from room temperature to the glass transition temperature, using a differential thermal expansion meter. A mean thermal expansion coefficient of from $90 \times 10^{-7}$/° C. to $120 \times 10^{-7}$/° C. has been judged to be satisfactory.

Ion Exchange Strengthening and Measurement of Bending Strength and Water Resistance The glass block was severed and polished to a 50 mm by 10 mm rectangular plate having a thickness of 3 mm. This glass plate was subjected to an alkali ion exchange treatment for ion exchange strengthening under the following conditions. In Examples A-1 to A-13 and Comparative Examples A-1 to A-3, the glass plates were treated by immersing for 4 hours in a molten salt consisting of 40% sodium nitrate and 60% potassium nitrate at 400° C. In Comparative Examples A-4 and A-5, the glass plates were treated by immersing for 4 hours in a molten salt consisting of 100% potassium nitrate at 430° C. After the alkali ion exchange treatment, the measurement of three-point bending strength was conducted in accordance with JIS R 1601, which is related to fine ceramics bending strength test method. As was previously mentioned, although strength of 1500 Kgf/cm$^2$ or more is generally required, a strength of 2000 Kgf/cm$^2$ or more has been judged to be satisfactory in the invention.

The ion exchange strengthened glass plate as above was immersed and held for 40 hours in 1 liter of pure water at 95° C. and then removed followed by determination of weight loss (mg) per unit surface area (1 cm$^2$) due to this immersion. The less the weight loss, the more satisfactory is the glass plate's water resistance. In fact, a weight loss of 0.05 mg/cm$^2$ or less has been judged to be satisfactory in the invention.

Glass Formability Evaluation

The glass block was placed in a platinum crucible equipped with a nozzle. After reheating and defoaming, the nozzle was heated to or above the working temperature. After that, each glass composition was dripped into a mold from the end of the nozzle to prepare a preliminary glass disk having an upper free surface and a size of 20 mm in diameter and 5 mm in thick. This was then clamped between an upper and lower dies made of austenite steel and having optical surfaces coated with Pt-Rh film, followed by hot pressing under conditions of 600° C. for 10 minutes at a pressure of 30 Kg/cm$^2$ and then allowed to cool to 400° C. The pressure was then released and the formed glass was allowed to cool followed by removal and evaluation, as follows. A surface roughness as determined by the tracer method of 4 nm or less is generally required for a substrate glass for information recording media. Therefore, evaluation standards consisted of evaluating that having a surface roughness of 4 nm or less and being free of wrinkles and cracks as being acceptable (indicated with ◯), and that having a defect such as a surface roughness in excess of 4 nm or the presence of wrinkles or cracks being unacceptable (indicated with x), as shown in Table 2.

The glass compositions are shown in Table 1, and each of the above-mentioned measurement results is shown in Table 2.

TABLE 1

| | Glass Composition (%) | | | | | | | | | |
|---|---|---|---|---|---|---|---|---|---|---|
| | $SiO_2$ | $Al_2O_3$ | $Li_2O$ | $Na_2O$ | $K_2O$ | MgO | CaO | BaO | $TiO_2$ | $ZrO_2$ |
| Ex. A-1 | 65 | 10 | 4 | 11 | 0 | 0 | 2 | 5 | 0 | 3 |
| Ex. A-2 | 60 | 12 | 4 | 13 | 0 | 2 | 0 | 3 | 3 | 3 |
| Ex. A-3 | 62 | 11 | 5 | 10 | 0 | 2 | 2 | 1 | 0 | 5 |
| Ex. A-4 | 62 | 12 | 4 | 13 | 0 | 3 | 0 | 3 | 0 | 3 |
| Ex. A-5 | 60 | 14 | 5 | 12 | 0 | 0 | 0 | 4 | 0 | 5 |
| Ex. A-6 | 58 | 15 | 5 | 10 | 0 | 0 | 0 | 5 | 5 | 2 |
| Ex. A-7 | 58 | 12 | 4 | 10 | 3 | 0 | 2 | 6 | 0 | 5 |
| Ex. A-8 | 58 | 12 | 4 | 11 | 0 | 0 | 0 | 10 | 0 | 5 |
| Ex. A-9 | 58 | 12 | 5 | 10 | 0 | 4 | 0 | 6 | 0 | 5 |
| Ex. A-10 | 58 | 12 | 5 | 10 | 0 | 0 | 4 | 6 | 0 | 5 |
| Ex. A-11 | 60 | 15 | 6 | 10 | 0 | 0 | 0 | 4 | 0 | 5 |
| Ex. A-12 | 62 | 15 | 4 | 13 | 0 | 0 | 0 | 4 | 1 | 1 |
| Ex. A-13 | 62 | 14 | 5 | 13 | 0 | 0 | 0 | 1 | 2 | 3 |
| Com. Ex. A-1 | 65 | 8 | 4 | 16 | 0 | 0 | 0 | 4 | 0 | 3 |
| Com. Ex. A-2 | 65 | 18 | 2 | 10 | 0 | 0 | 0 | 2 | 0 | 3 |
| Com. Ex. A-3 | 65 | 12 | 4 | 16 | 0 | 0 | 3 | 0 | 0 | 0 |
| Com. Ex. A-4 | 62 | 16 | 0 | 13 | 4 | 4 | 0 | 0 | 1 | 0 |
| Com. Ex. A-5 | 72 | 2 | 0 | 13 | 1 | 4 | 8 | 0 | 0 | 0 |

TABLE 2

| | Glass Thermal Properties | | | | | | | Other Test Results | | |
|---|---|---|---|---|---|---|---|---|---|---|
| | Melting temp. (° C.) | Working temp. (° C.) | Softening temp. (° C.) | Pressing temp. (° C.) | Strain point (° C.) | Mean thermal expansion coeff. ($\times 10^{-7}$/° C.) | Glass Transition point (° C.) | Formability | Bending strength ($Kgf/cm^2$) | Weight loss in water ($mg/cm^2$) |
| Ex. A-1 | 1450 | 992 | 665 | 575 | 461 | 104 | 493 | ○ | 3200 | 0.03 |
| Ex. A-2 | 1384 | 952 | 670 | 579 | 463 | 108 | 501 | ○ | 3500 | 0.03 |
| Ex. A-3 | 1359 | 949 | 690 | 589 | 462 | 101 | 509 | ○ | 3600 | 0.03 |
| Ex. A-4 | 1432 | 985 | 668 | 571 | 449 | 105 | 487 | ○ | 3400 | 0.03 |
| Ex. A-5 | 1422 | 975 | 676 | 582 | 462 | 108 | 492 | ○ | 3700 | 0.03 |
| Ex. A-6 | 1422 | 979 | 647 | 575 | 483 | 110 | 504 | ○ | 3400 | 0.04 |
| Ex. A-7 | 1420 | 984 | 689 | 599 | 484 | 109 | 514 | ○ | 3200 | 0.03 |
| Ex. A-8 | 1442 | 989 | 665 | 586 | 484 | 106 | 503 | ○ | 3000 | 0.03 |
| Ex. A-9 | 1349 | 943 | 671 | 580 | 465 | 104 | 504 | ○ | 3000 | 0.03 |
| Ex. A-10 | 1333 | 926 | 663 | 577 | 467 | 107 | 500 | ○ | 3400 | 0.03 |
| Ex. A-11 | 1419 | 961 | 660 | 567 | 450 | 105 | 485 | ○ | 3800 | 0.03 |
| Ex. A-12 | 1435 | 998 | 685 | 596 | 482 | 104 | 519 | ○ | 3200 | 0.04 |
| Ex. A-13 | 1423 | 962 | 655 | 564 | 449 | 111 | 482 | ○ | 3400 | 0.03 |
| Com. Ex. A-1 | 1371 | 915 | 620 | 529 | 415 | 117 | 445 | ○ | 1800 | 0.13 |
| Com. Ex. A-2 | 1768 | 1220 | 788 | 690 | 563 | 85 | 592 | x | 3600 | 0.02 |
| Com. Ex. A-3 | 1386 | 929 | 633 | 539 | 421 | 117 | 462 | ○ | 2300 | 0.12 |
| Com. Ex. A-4 | 1750 | 1260 | 870 | 740 | 576 | 101 | 635 | x | 3800 | 0.03 |
| Com. Ex. A-5 | 1426 | 1040 | 737 | 639 | 513 | 98 | 556 | x | 2500 | 0.03 |

Results

In Examples A-1 to A-13, glass thermal properties, formability and bending strength and water resistance (weight loss) of the ion exchanged glass were all satisfactory, and bending strength in particular far exceeded the desired strength (2,000 $kgf/cm^2$), while formability was also extremely good. Comparative Examples A-1 to A-5 were inferior for any one or a plurality of the above-mentioned glass thermal properties and other test results.

EXAMPLES B-1 to B-6 & COMPARATIVE EXAMPLES B-1 to B-3

Each of these examples and comparative examples was conducted by the following procedures.

Glass Melting

A glass was obtained from a chemical composition shown in Table 3, using the same procedure as that of Example A-1.

Measurement of Glass Viscosity

By the same method as that of Example A-1, the temperature (melting temperature) at which the glass exhibits a viscosity of $10^2$ poises, the temperature (working temperature) at which the glass exhibits a viscosity of $10^4$ poises, the softening point (temperature at which the glass exhibits a viscosity of $10^{7.6}$ poises) and the strain point (temperature at which the glass exhibits a viscosity of $10^{14.5}$ poises) were measured. Furthermore, the temperature at which the glass exhibits a viscosity of $10^{10}$ poises (preferable pressing temperature) was determined using the same method as that of Example A-1. Similar to Example A-1, a melting temperature of 1450° C. or lower, a working temperature of 1000° C. or lower, and a softening point of 700° C. or lower have been judged to be satisfactory. The above-mentioned pressing temperature is preferably 600° C. or lower.

Measurement of Mean Thermal Expansion Coefficient and Glass transition temperature The glass transition temperature and the mean thermal expansion coefficient from room temperature to the glass transition temperature were determined using the same methods as Example A-1. In Examples B-1 to B-6 and Comparative Examples B-1 to B-3, a glass transition temperature of 481° C. or lower was judged to be satisfactory, while a thermal expansion coefficient of from $100 \times 10^{-7}/°$ C. to $130 \times 10^{-7}/°$ C. was judged to be satisfactory.

Preparation of Ion Exchanged Glass and Measurement of Bending Strength and Water Resistance The glass block was severed and polished to have a mirror finished surface, thereby obtaining a 50 mm by 10 min rectangular test sample having a thickness of 3 mm for testing of bending strength and a 50 mm by 20 mm rectangular test sample having a thickness of 3 mm for testing of water resistance. Each sample was immersed in an alkali liquid for an ion exchange treatment. The conditions for this treatment are described below.

Ion exchange liquid: Molten salt consisting of 40% sodium nitrate and 60% potassium nitrate (100% potassium nitrate was used for the soda-lime glass of Comparative Example B-3.);

Immersion temperature: glass transition temperature (° C.)×0.8; and

Immersion time: 2 hours.

After the ion exchange treatment, the sample was removed from the alkali liquid, allowed to cool and washed followed by measurement of bending strength and water resistance. These respective conditions are indicated below.

Bending strength measurement: Three-point bending strength according to JIS R 1601 in the same manner as Example A-1. The strength (kgf/cm$^2$) value shown in Tables 3 and 4 represents the average of ten samples (standard deviation: approx. ±200 kgf/cm$^2$).

Although strength of 1500 Kgf/cm$^2$ (approx. 147 MPa) or more is required generally, strength of 2000 Kgf/cm$^2$ (approx. 196 MPa) or more has been judged to be satisfactory, as mentioned above.

Water resistance evaluation: The sample was immersed in water under the same conditions as Example A-1 followed by measurement of weight loss (mg) per unit surface area (1 cm$^2$). Weight loss of 0.05 mg/cm$^2$ or less has been judged to be satisfactory.

Glass Formability

The glass was pressed in the same manner as Example A-1 followed by evaluation according to the same standards of Example A-1.

The glass compositions and each of the above-mentioned measurement results are shown in Tables 3 and 4.

TABLE 3

| Examples and Comparative Examples | Ex. B-1 | Ex. B-2 | Ex. B-3 | Ex. B-4 | Ex. B-5 |
|---|---|---|---|---|---|
| Composition (wt %) | | | | | |
| SiO$_2$ | 62.0 | 63.0 | 61.0 | 62.0 | 66.0 |
| Al$_2$O$_3$ | 10.0 | 9.0 | 9.0 | 10.0 | 7.0 |
| Li$_2$O | 5.0 | 5.0 | 5.0 | 5.0 | 4.0 |
| Na$_2$O | 13.0 | 13.0 | 13.0 | 14.0 | 15.0 |
| K$_2$O | — | — | — | — | — |
| MgO | — | — | — | — | — |
| CaO | — | — | 2.0 | — | — |

TABLE 3-continued

| Examples and Comparative Examples | Ex. B-1 | Ex. B-2 | Ex. B-3 | Ex. B-4 | Ex. B-5 |
|---|---|---|---|---|---|
| BaO | 5.0 | 5.0 | 5.0 | 4.0 | 2.0 |
| TiO$_2$ | — | — | — | — | — |
| ZrO$_2$ | 5.0 | 5.0 | 5.0 | 5.0 | 6.0 |
| Thermal Properties | | | | | |
| Mean thermal expansion coef. (×10$^{-7}$/° C., 30° C.-glass transition temp.) | 112 | 111 | 113 | 112 | 110 |
| Melting temp. (° C., 10$^2$ poises) | 1372 | 1372 | 1320 | 1368 | 1410 |
| Working temp. (° C., 10$^4$ poises) | 942 | 935 | 910 | 928 | 962 |
| Pressing temp. (° C., 10$^{10}$ poises) | 566 | 562 | 564 | 562 | 583 |
| Glass transition temp. (° C.) | 480 | 478 | 481 | 472 | 475 |
| Softening point (° C.) | 650 | 645 | 637 | 645 | 675 |
| Strain point (° C.) | 456 | 449 | 445 | 445 | 450 |
| Chemical strengthening conditions | | | | | |
| Temperature (° C.) | 385 | 385 | 385 | 380 | 380 |
| Time (hr) | 2 | 2 | 2 | 2 | 2 |
| Other test results | | | | | |
| Strength (Kgf/cm$^2$) | 2600 | 2500 | 2400 | 2600 | 2000 |
| Water resistance (mg/cm$^2$) | 0.02 | 0.03 | 0.02 | 0.02 | 0.02 |
| Glass formability | ○ | ○ | ○ | ○ | ○ |

TABLE 4

| Examples and Comparative Examples | Ex. B-6 | Com. Ex. B-1 | Com. Ex. B-2 | Com. Ex. B-3 |
|---|---|---|---|---|
| Composition (%) | | | | |
| SiO$_2$ | 59.0 | 63.0 | 64.0 | 72.0 |
| Al$_2$O$_3$ | 11.0 | 6.0 | 3.0 | 2.0 |
| Li$_2$O | 6.0 | 5.0 | 8.0 | — |
| Na$_2$O | 12.0 | 18.0 | 12.0 | 13.0 |
| K$_2$O | 2.0 | — | 2.0 | 1.0 |
| MgO | — | — | — | 4.0 |
| CaO | — | 5.0 | — | 8.0 |
| BaO | 2.0 | 3.0 | 5.0 | — |
| TiO$_2$ | 2.0 | — | 3.0 | — |
| ZrO$_2$ | 6.0 | — | 3.0 | — |
| Thermal Properties | | | | |
| Mean thermal expansion coef. (×10$^{-7}$/° C., 30° C.-glass transition temp.) | 117 | 132 | 138 | 98 |
| Glass transition temp. (° C.) | 468 | 395 | 365 | 556 |
| Melting temp (° C., 10$^2$ poises) | 1302 | 1151 | 1098 | 1426 |
| Working temp. (° C., 10$^4$ poises) | 905 | 772 | 695 | 1040 |
| Pressing temp. (° C., 10$^{10}$ poises) | 558 | 475 | 431 | 639 |
| Softening point (° C.) | 645 | 549 | 508 | 737 |
| Strain point (° C.) | 439 | 360 | 330 | 513 |
| Chemical strengthening conditions | | | | |
| Temperature (° C.) | 375 | 320 | 290 | 445 |
| Time (hr) | 2 | 2 | 2 | 2 |
| Other test results | | | | |
| Strength (Kgf/cm$^2$) | 2200 | 1100 | 1200 | 2800 |
| Water resistance | 0.03 | 0.09 | 0.08 | 0.02 |
| Glass formability | ○ | Not tested | Not tested | x |

Results

In Examples B-1 to B-6, thermal properties including thermal expansion coefficient, glass transition temperature and softening point were all within the preferable ranges, chemical strengthening was able to be performed at a low temperature, and the degree of strengthening and water resistant performance of the strengthened glass were satisfactory. The degree of strengthening and water resistance of Comparative Examples B-1 and B-2 were both inferior. In Comparative Example B-3 (soda-lime glass), the glass transition temperature was high and formability was inferior.

What is claimed is:

1. A lithium-sodium-aluminosilicate glass composition, comprising in terms of percentage by weight 58–66% $SiO_2$, 7–15% $Al_2O_3$, 4–7% $Li_2O$, 10–15% $Na_2O$, 0–3% $K_2O$, 0–4% MgO, 0–4% CaO, 0–2% SrO, 1–10% BaO, 0–5% $TiO_2$ and 1–6% $ZrO_2$, wherein the glass composition has a softening point of 700° C. or lower;

wherein a first temperature at which the glass composition exhibits a viscosity of $10^2$ poises is 1450° C. or lower;

wherein a second temperature at which the glass composition exhibits a viscosity of $10^4$ poises is 1000° C. or lower; and wherein the glass composition has a mean thermal expansion coefficient between 30° C. and a glass transition temperature within a range of from $90 \times 10^{-7}$/° C. to $130 \times 10^{-7}$/° C.

2. A glass composition according to claim 1, wherein the glass composition comprises in terms of percentage by weight 58–65% $SiO_2$, 10–15% $Al_2O_3$, 4–6% $Li_2O$, 10–13% $Na_2O$, 0–3% $K_2O$, 0–4% MgO, 0–4% CaO, 0–2% SrO, 1–10% BaO, 0–5% $TiO_2$ and 1–5% $ZrO_2$, and wherein the coefficient is within a range of from $90 \times 10^{-7}$/° C. to $120 \times 10^{-7}$/° C.

3. A glass composition according to claim 1, wherein the glass composition comprises in terms of percentage by weight 59–66% $SiO_2$, 7–12% $Al_2O_3$, 4–7% $Li_2O$, 12–15% $Na_2O$, 0–3% $K_2O$, 0–4% MgO, 0–4% CaO, 0–2% SrO, 1–10% BaO, 0–5% $TiO_2$ and 3–6% $ZrO_2$, wherein the coefficient is within a range of from $100 \times 10^{-7}$/° C. to $130 \times 10^{-7}$/° C., and wherein the glass composition comprises a glass transition temperature of 481° C. or lower.

4. A glass composition according to claim 1, wherein the glass composition comprises a third temperature at which the glass composition exhibits a viscosity of $10^{10}$ poises, the third temperature being 600° C. or lower.

5. A process for producing an ion exchange strengthened glass article, the process comprising:

pressing the lithium-sodium-aluminosilicate glass composition according to claim 3 at the softening point or lower, thereby obtaining a precursor of the glass article; and bringing the precursor into contact with a molten salt comprising a potassium salt, thereby conducting an alkali ion exchange strengthening.

6. A process according to claim 5, wherein said pressing is with a press die coated with a film of a material selected from the group consisting of noble metals, tungsten, tantalum, and alloys of these metals.

7. A process according to claim 5, wherein said pressing is conducted by heating the glass composition at a temperature at which the glass composition exhibits a viscosity of $10^{12}$ poises or higher.

8. A process according to claim 7, wherein said pressing is conducted by heating the glass composition at about a temperature at which the glass composition exhibits a viscosity of $10^{10}$ poises.

9. A process according to claim 5, wherein said pressing is conducted under a pressure of from 10 to 50 kgf/cm$^2$.

10. A process according to claim 5, wherein the molten salt further comprises a sodium salt.

* * * * *